United States Patent [19]

Ivey et al.

[11] Patent Number: 5,793,357

[45] Date of Patent: Aug. 11, 1998

[54] DEVICE AND METHOD FOR DETERMINING MOVEMENT OF A SURFACE

[76] Inventors: Peter Anthony Ivey, Revell Grange Cottage Bingley Lane, Rivelin Valley, Sheffield S6 6GA, Great Britain; Andrew David Houghton, 33 Providence Road, Walkley, Sheffield S6 5BD, Great Britain

[21] Appl. No.: 436,294

[22] PCT Filed: Nov. 15, 1993

[86] PCT No.: PCT/GB93/02348

§ 371 Date: Jul. 5, 1995

§ 102(e) Date: Jul. 5, 1995

[87] PCT Pub. No.: WO94/11845

PCT Pub. Date: May 26, 1994

[30] Foreign Application Priority Data

Nov. 14, 1992 [GB] United Kingdom .............. 9223915
Oct. 18, 1993 [GB] United Kingdom .............. 9321485

[51] Int. Cl.⁶ .................................................. G09G 5/08
[52] U.S. Cl. ............................ 345/166; 345/167; 345/179; 250/221
[58] Field of Search .................................. 345/156, 157, 345/158, 159, 163, 164, 165, 166, 167, 179, 180, 181–183; 178/18, 19; 250/221, 200, 229, 216, 237 R, 237 G; 273/148 B; 473/37

[56] References Cited

U.S. PATENT DOCUMENTS

| | | | |
|---|---|---|---|
| 4,716,542 | 12/1987 | Peltz et al. | 345/163 |
| 4,794,384 | 12/1988 | Jackson | 345/166 |
| 4,847,484 | 7/1989 | Kikuchi | 345/166 |
| 4,920,260 | 4/1990 | Victor et al. | 345/166 |

*Primary Examiner*—Lun-Yi Lao
*Attorney, Agent, or Firm*—Galgano & Burke

[57] ABSTRACT

A device for determining movement of a surface relative to a detector, the detector comprising a source of radiation directed at the surface and a plurality of radiation sensors arranged to detect an intensity pattern due to interference in the radiation reflected back from the surface, the device also comprising mechanism for repeatedly or continuously monitoring the outputs from the sensors, and comparison mechanism for calculating the combination of the product of the interstitial spatial and temporal intensity gradients between adjacent sensors and using the gradients to yield a result indicative of the movement of the surface relative to the detector.

24 Claims, 8 Drawing Sheets

Fig. 10 PART 1

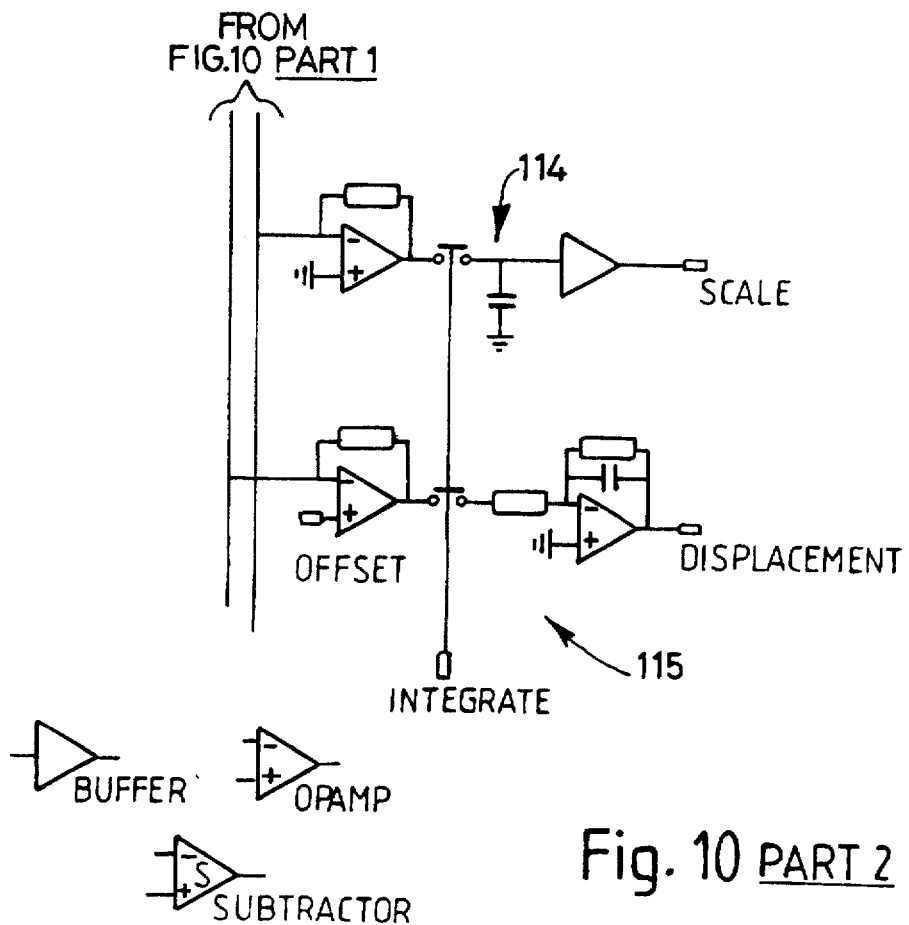
Fig. 10 PART 2
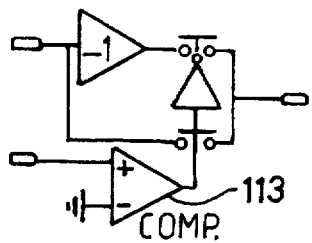
Fig. 11
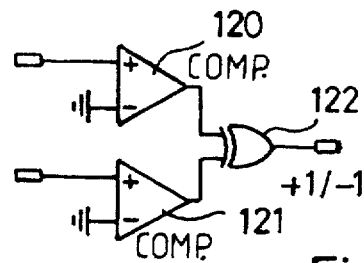
Fig. 12
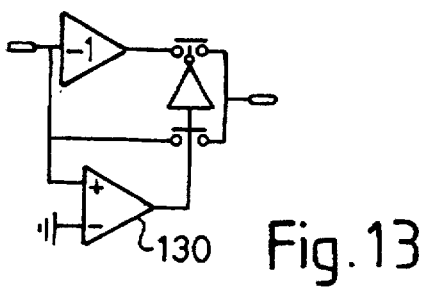
Fig. 13
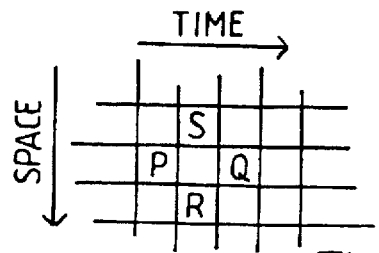
Fig. 14

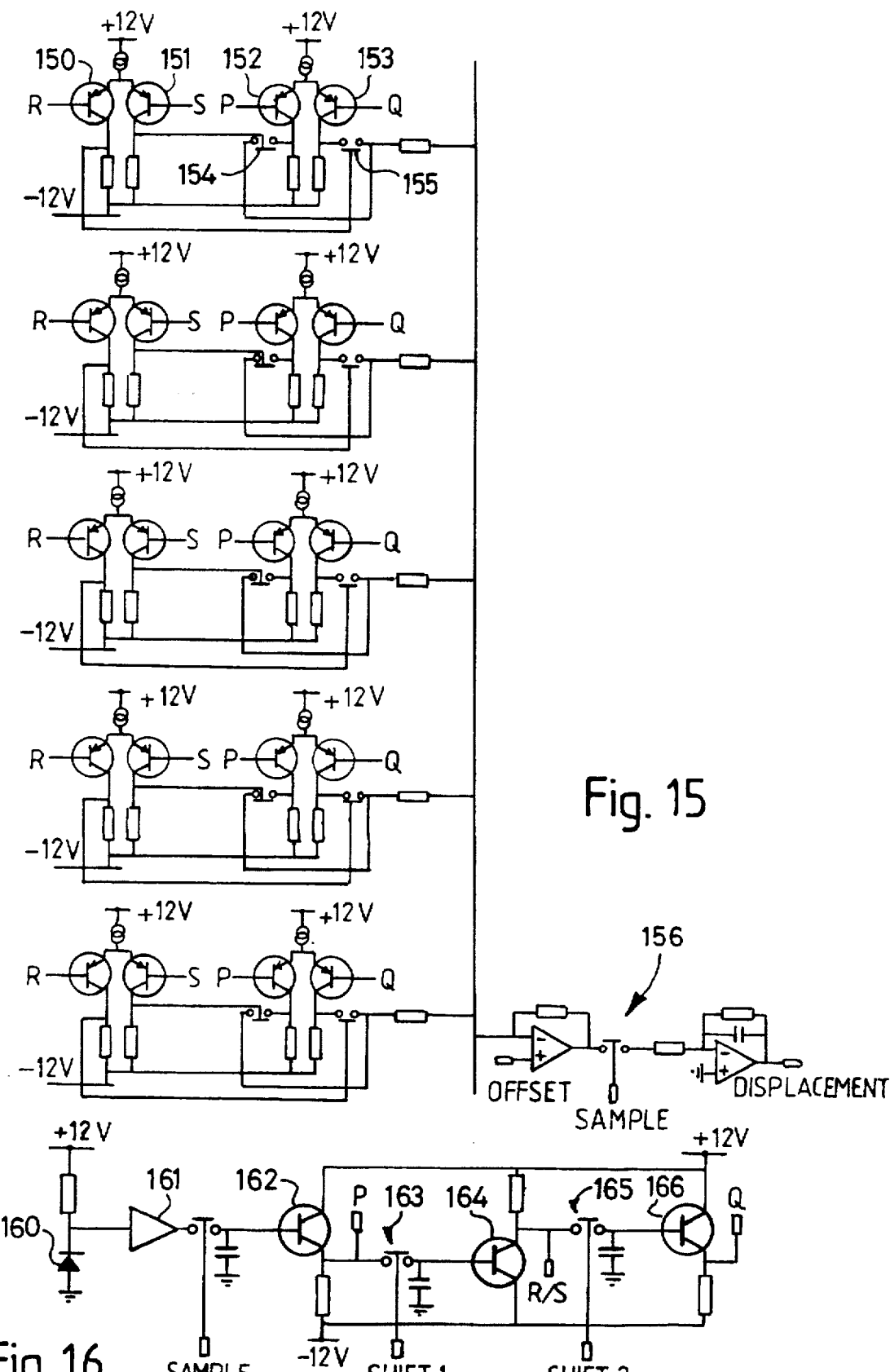

DEVICE AND METHOD FOR DETERMINING MOVEMENT OF A SURFACE

FIELD OF THE INVENTION

This invention relates to a device for and method of determining movement of a surface. The device and method can be applied to a wide range of practical devices such as high resolution pointing devices for computers ("pens", and mouse or tracker ball input devices), seismic detectors, digital microphones, precision instruments or machine tools, and computer output devices such as electrostatic plotters.

BACKGROUND TO THE INVENTION

There is a need for an accurate pointing device for use with smaller personal computers, especially the notebook sized computers which are now becoming increasingly popular, and even smaller "tablet" computers, for which conventional keyboards cannot readily be used. Conventional pointing devices are not readily usable with such computers, because of their size, and "pen" pointing devices have been developed to meet this need. However, these typically have resolutions of the order of 100 dpi (dots per inch) equivalent to 250 µm, which is far too low for precise applications such as online, hand-written character recognition. Such applications become ever more desirable as size and other considerations lead away from the use of conventional keyboards as the means of inputting data.

The conventional pointing devices used with desk-top computers, for example the mouse and the tracker ball, typically rely on sensing mechanically the movement of the ball. Resolutions are still relatively low, being of the order of 400 dpi, and the devices are subject to problems of reliability.

When light impinges on a rough surface (in this context almost all surface are "rough"), for example paper, local interference of the reflected light via multiple path lengths gives rise to a pattern. This pattern depends upon the relative positions of the light source, the detector and the surface. The effect can be greatly enhanced by the use of an intense beam such as is available from a laser and is commonly known as laser speckle. As the surface moves with respect to the source, the speckle pattern moves in a way that is directly related to the relative motion. It has been found that by detecting the movement of this pattern, the movement relative to the surface can be detected with greatly enhanced resolution.

It has previously been proposed to use laser speckle in velocity measurement. For example, EP-A-0 295 720 discloses a device for measuring the speed of a manufacturing line which has a spaced pair of detectors detecting the passage of intensity peaks in laser light scattered back from the moving surface of the line. Length of an object on the line can also be measured by the device. Dobrido et al (Opt. Spectrosc. (USSR) 65(1), July 1988, 125–6) disclose a speckle correlator for studying rough surface displacements using photographically recorded speckle images. Neither of these proposals permits real-time movement detection in two dimensions.

Attempts have been made to use speckle patterns in the construction of a pad-less optical mouse, for example in U.S. Pat. No. 4,794,384 (Xerox Corporation).

This technology uses "bit wise auto correlation" to compare a given bit value for each of the 256 cells in a 16×16 sensor array with the bit value of neighbouring cells surrounding the given cell to determine how many such comparisons are the same and then a count is made of the number of such comparisons for different groups of identical cell pair comparisons.

The Xerox system is, therefore, based upon a preponderance of "votes" determining a direction movement. The system utilizes the concept of comparing values of samples neighbouring a previous sample with each array cell value in a new sample to determine if they are the same. If any of the 8 comparisons provide an indication of being the same, whether a dark feature or a light feature, then there is a possibility that the pattern feature being detected has "moved" to a new cell position. An identical cell pair value counts as one point and the appropriate counter representing that pair comparison is incremented. It can be seen then that if a certain majority of light features detected in the speckle pattern presented to the ray have moved in a given direction and also a given majority of dark features have moved in the same direction, a reliable indication has been derived that the relative motion between the array and the reflecting surfaces is the given direction.

This method of comparison incurs a substantial processing cost and typically high level resolution cannot affordably be achieved at the processing speeds necessary to give real-time movement detection in two dimensions.

What would be simpler and more affordable would be to have a device for determining the extent and direction of movement, to a high degree of accuracy, but which did not reply upon the capture, storage and comparative analysis of successive images.

SUMMARY OF THE INVENTION

According to the invention, there is provided a device for determining movement of a surface relative to a detector, the detector comprising a source of radiation directed at the surface and a plurality of radiation sensors arranged to detect an intensity pattern due to interference in the radiation reflected back from the surface, the device also comprising means for repeatedly or continuously monitoring the outputs from the sensors, and comparison means for calculating the interstitial spatial and temporal intensity gradients between adjacent sensors and using said gradients to yield a result indicative of the movement of the surface relative to the detector.

Preferably, the radiation is from a coherent source, for example a laser. The detectors are preferably arranged in a two-dimensional array, with the displacement being calculated for each orthogonal direction. It has been found that, while a large array of sensors will give high precision, satisfactory performance, in terms of resolution and speed, can be obtained using a relatively small number of sensors, for example a pair of intersecting linear arrays each having only eight sensors or pixels. As few as two sensors in each direction can be used with acceptable results still obtainable.

Preferably the device has more than two sensors and/or monitors the outputs from the sensors continuously or for many repeats thereby enabling spatial and/or temporal oversampling, respectively.

The invention also provides a method or determining movement of a surface, comprising directing radiation at the surface and detecting an intensity pattern due to interference in the radiation from the surface, repeatedly or continuously monitoring the outputs from the sensors, and comparison means for calculating the interstitial spatial and temporal intensity gradients between adjacent sensors and using said gradients to yield a result indicative of the movement of the surface relative to the detector.

The device is suitably a pointing device for a computer and comprises a body having an aperture therein movable across a surface and means for mounting within the body in fixed relation to the aperture the radiation source and detector of said device, and interface means for transmitting to a computer signals representing the movements determined thereby. Alternatively, the body has a ball rollably mounted therein and means for mounting within the body in fixed relation to the surface of the ball the radiation source and detector of said device. Thus, the device may take the form of a mouse or a tracker ball.

The ultra-high resolution obtainable by devices in accordance with the invention permits their use in applications where only small movements are available. Conventional tracker balls typically require movements of many rotations in order to cover significant distances on the display of the associated computer. Their low resolution means that direction of small movements, such as would be required in handwriting recognition, would not be possible. Another embodiment of the invention provides a tracker ball engageable by a pen to register small movements and by the hand to make large movements across the display. The high resolution of the tracker ball of the invention gives the gain necessary to travel large distances across the display, while retaining the "pen-point" precision necessary in drafting, writing or other pen applications. The ball is suitable made large than in a conventional tracker ball device, and the surface is suitably dimpled to assist engagement of the pen point. A very light suspension for the ball will facilitate its use in this way. A significant advantage of this arrangement is that absolute positioning is not lost if the pen leaves the writing surface.

It has been found that the focus of the detector is not critical, it is not necessary for the detector to be focused on the surface, and in some circumstances better results may be obtainable when the surface is not in focus.

The radiation, which is preferably coherent radiation, will conveniently be infra-red radiation for pointing electromagnetic device applications; suitable optical filters can then ensure that the effects of ambient radiation are minimised. However for certain applications, radiation of other wavelengths may be preferred and conceivably alternative non-electromagnetic, eg. particulate or audio, forms of radiation which also generate interference patterns may be used. For example, the method may be applicable to X-ray lithographic manufacturing techniques to ensure accurate positioning. The method is thought to be capable of positioning to tens of nanometers or better.

In an alternative application of the invention to that described immediately above, the device for determining movement of a surface relative to a detector serves as a digital microphone and has a diaphragm responsive to sound waves wherein the radiation impinges on the surface of the diaphragm in order that motion normal to the diaphragm can be detected by measuring the displacement of the speckle pattern.

BRIEF DESCRIPTION OF THE DRAWINGS

FIG. 11 illustrates one implementation of a component of FIG. 10;

FIGS. 12 and 13 illustrate alternative implementations of another of the components of FIG. 10;

FIG. 14 illustrates the basis for an alternative algorithm for determining movement.

FIG. 15 is a block circuit diagram of an alternative calculating means to that illustrated in FIG. 10.

FIG. 16 is a circuit diagram of one block of a sampling stage for the circuit shown in FIG. 15.

DESCRIPTION OF THE ILLUSTRATED EMBODIMENTS

Figure 1:
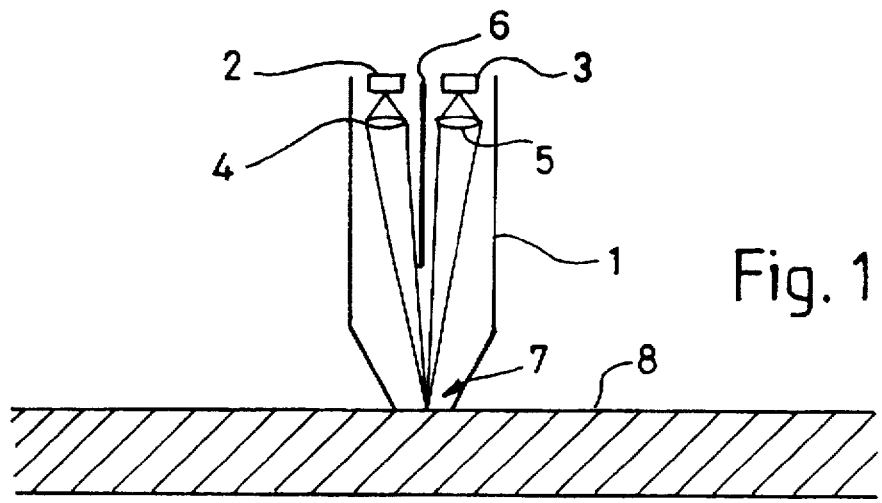
FIG. 1 is a diagrammatic sectional elevation of a "pen" pointing device in accordance with the invention.

Referring first to FIG. 1, the "pen" pointing device comprises a body 1 containing a laser diode 2 and a photodiode detector array 3, each with a respective focusing optical system 4 and 5. The laser diode 2 and the array 3 are separated from each other by a light shield 6. The optical systems 4 and 5 are illustrated as being focused on a point corresponding to the plane of an opening 7 in the end of the body 1, the opening, in use, being brought into contact with the working surface 8, for example the display screen of a tablet computer. However, in practice, it is not essential for the optical systems to focus on the surface, and in some circumstances better results may be obtainable by focusing at a notional point above or below the surface.

Figure 2:
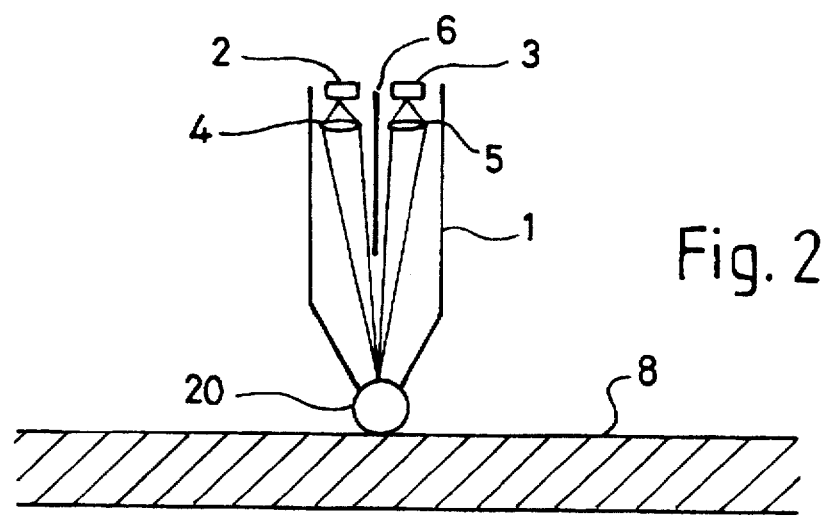
FIG. 2 is a corresponding view of an alternative arrangement using a ball as the surface whose movement is directly detected to give a measure of movement of the ball over a working surface.

In the alternative construction shown in FIG. 2, the opening in the end of the pen body is replaced by a housing for a captive ball 20, and the optical systems 4 and 5 are then directed generally toward the surface of the ball 20 within the body 1.

Figure 3:
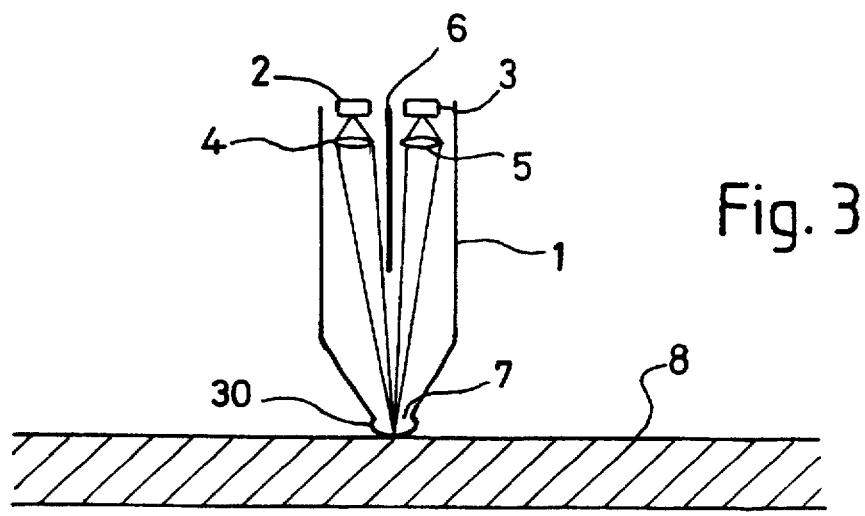
FIGS. 3 and 4 are views illustrating slightly modified versions of the device shown in FIG. 1.
Figure 4:
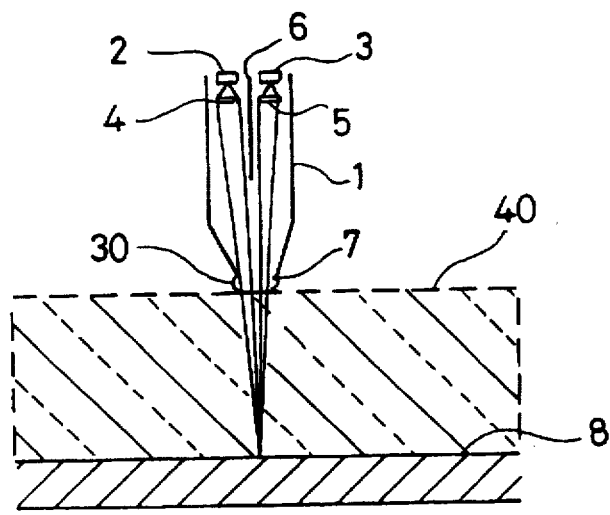

In FIGS. 3 and 4 the "pen" pointing device has the opening 7 in the end of the body 1 closed by a transparent cover 30 to prevent clogging with dust, paper fragments, or dirt, and to provide a smoother feel to the device as it is moved over a surface, for example paper. In the embodiment of FIG. 3, the optical systems 4 and 5 are arranged to converge approximately at the surface 8 with which the cover 30 is brought into contact, while in the embodiment of FIG. 4, the point of convergence is beyond the cover 30, a protective glass layer 40 being placed over the surface 8 to prevent wear to the surface. The cover 30 is preferably in the form of a micro-lens.

Figure 5:
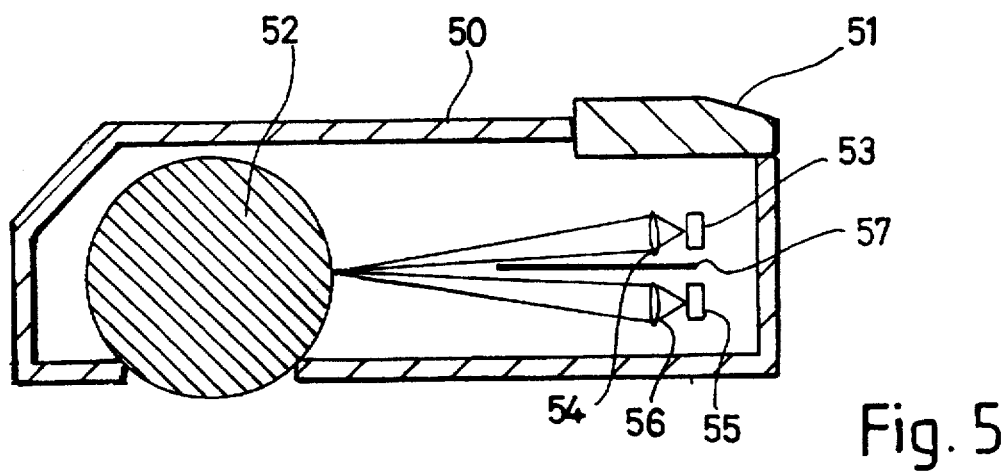
FIG. 5 is a diagrammatic sectional elevation of a "mouse" pointing device in accordance with the invention.

The mouse illustrated in FIG. 5 comprises a conventional mouse body 50, having control buttons 51, and mounting in suitable suspension means (not shown) a ball 52. A laser diode 53 and associated optical system 54 directs light on to the surface of the ball within the body, in the same manner as in the embodiment illustrated in FIG. 2. A detector array 55 is mounted adjacent to the laser diode 53, with its own optical system 56 directed towards the ball. A shield 57 separates the laser from the detector array.

Figure 6:
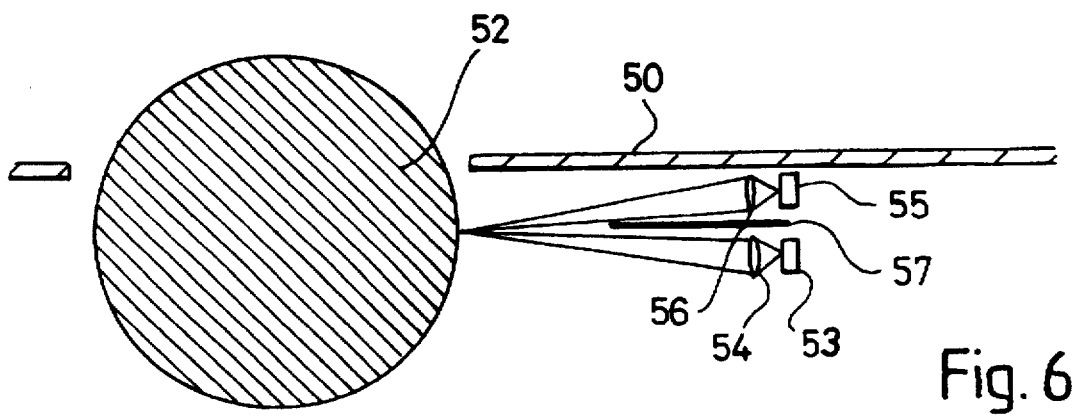
FIG. 6 is a partial sectional elevational of a tracker ball pointing device in accordance with another embodiment of the invention.
Figure 7:
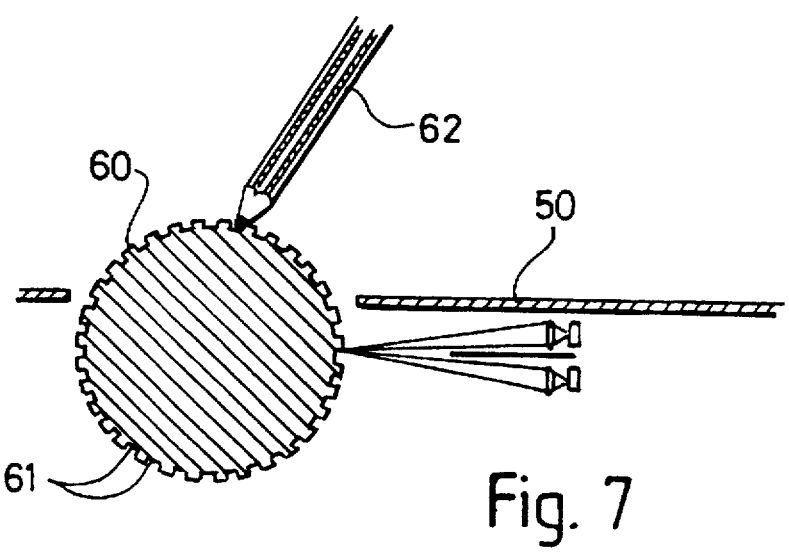
FIG. 7 illustrates a modified form of the device shown in FIG. 6.

The arrangement shown in FIG. 6, for a tracker ball device, is essentially the same as in the mouse shown in FIG. 5, but inverted, the ball 52 suitably being larger. FIG. 7 illustrates a modified form of the tracker ball shown in FIG. 6, employing the high resolution available to enable its use in such applications as handwriting recognition. The surface of the ball 60 is provided with a plurality of uniformly-spaced dimples 61 engageable by the point of a pencil 62 or stylus or the like. The dimples are shown in the drawing on an exaggerated scale for clarity; in practice they would not need to be deep, and for precision there might need to be only a small distance between adjacent dimples. The ball could conveniently be made of a larger diameter than with conventional tracker balls to provide a flatter surface for writing, and to permit an acceptable range of movement in writing before the pencil need be lifted from the ball.

Figure 17:
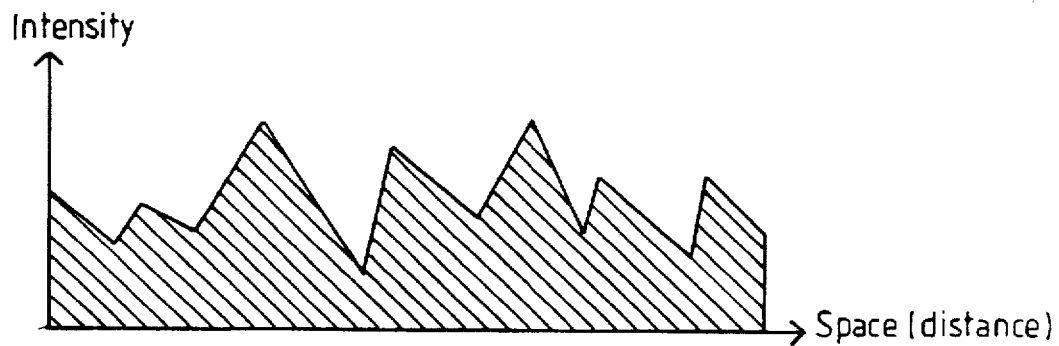
FIG. 17 is a graphical representation of a typical intensity profile through laser speckle.

FIG. 17 shows a typical intensity profile through a laser spot, reflecting off a 'rough' surface. Here, rough means not optically flat. Constructive and destructive interference causes the intensity profile to vary, giving rise to the well known laser speckle effect. Because laser speckle is generated by random undulations in the illuminated surface, the speckle itself is random in nature. It should be noted that the relationship between speckle and surface features is not a simple one to one contour map, but every part of the resulting speckle image depends on every part of the illuminated surface. A change in part of the surface under the spot could therefore cause the entire speckle pattern to change.

Speckle is visible on a rough surface regardless of the angle of incidence of the light. The angle of incidence does, however, appear to be an important factor in producing a usable pattern. Where the angle of incidence of the light source is near to the surface normal, the speckle pattern clearly follows the underlying motion of the surface relative to the detector. If the angle of incidence is shallow, however, while pattern motion is visible, it is somewhat obscured by a noise component in the image.

Figure 8:
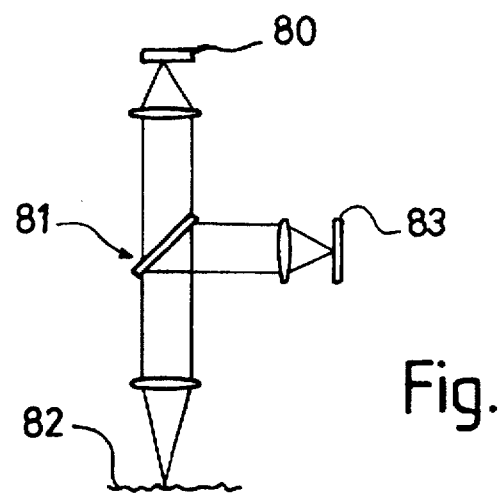
FIG. 8 is a diagram showing an alternative arrangement for the optical components in any of the preceding embodiments.

While the angle at which the illuminated surface is viewed by the detector does not appear to be critical, it has been found that many advantages can be gained by viewing in the same plane as the source. FIG. 8 shows one arrangement of the illumination/detection components by which this can be realised, with the light source 80 directed through a semi-reflective mirror 81 on to the surface 82, the light scattered back from the surface being reflected by the semi-reflective mirror 81 on to the detector 83.

Figure 18:
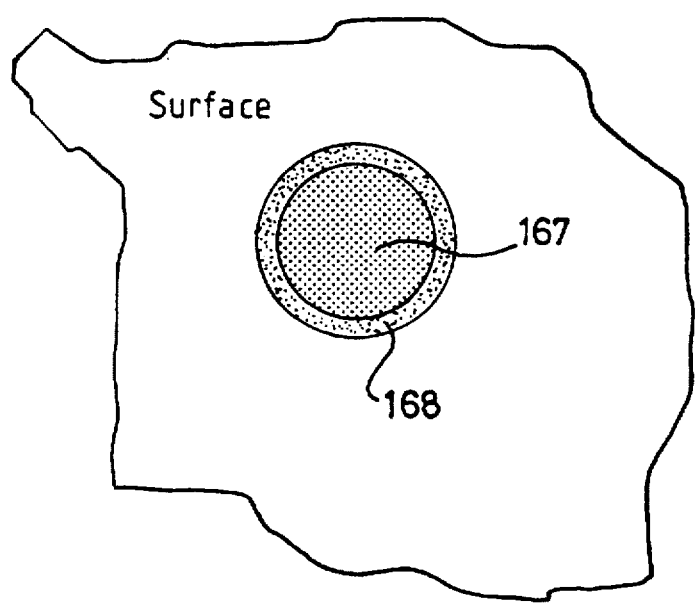
FIG. 18 shows diagrammatically, without showing its random nature, a speckle pattern of a laser spot.

As the illuminated surface moves relative to the laser source and detector, the speckle pattern also moves. Part of the moving speckle pattern results from reflections off the surface in areas continuously under the laser spot during movement (towards the middle of the spot), while a second component arises from reflections off areas of the surface that either move under the spot, or move out from under the spot during movement (at the periphery of the spot). FIG. 18 illustrates this.

Speckle from the centre of the spot 167 appears to move coherently with respect to surface movement, providing a means of tracking the surface, while speckle created by the periphery of the spot 168, appears more random in nature, adding 'dither' to the overall speckle image. If a large spot is used, the central area contributes a much larger amount to the speckle image than does the peripheral spot region (the ratio increasing with radius) resulting in mostly coherently moving speckle. Where a very small spot is used, the speckle appears to change mostly randomly with movement, and it is difficult to extract movement in this case.

To measure movement of the surface in one dimension (in the plane of the surface), one could use two light sensors and track the intensity changes at the two points. However, the random nature of the speckle, and added dither means that by using more sensors, and averaging the results, we can improve the spatial resolution to which we can discriminate movement. This implies that resolution is not fundamentally limited to wavelength (or some faction of) the light source used. This is effectively spatial oversampling. If more results per second are produced than are usually required, then these can also be averaged in time to improve resolution, this being temporal oversampling.

Figure 19:
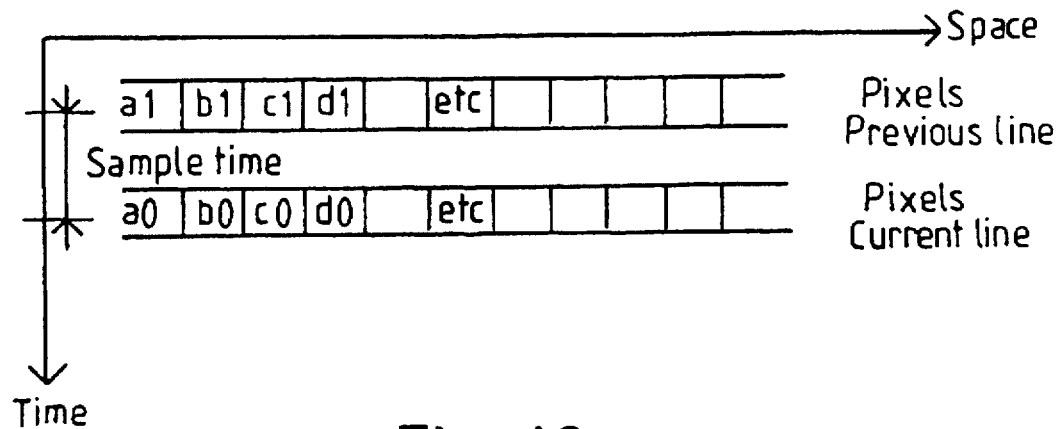
FIG. 19 is a diagrammatic representation of a one dimensional array of pixels in time.

A simple approach to determining movement from the speckle would be to sample an image of the speckle, and correlate this with subsequent images, in order to determine to where the speckle has moved. While undoubtedly this works, and is the basis of the method used in U.S. Pat. No. 4,794,384, it incurs a substantial processing cost. A more attractive high resolution and computationally low cost solution works as follows:

With reference to FIG. 19, consider a one dimensional imaging array where we acquire a one dimensional image of a line through the speckle, at regular intervals in time.

Consider the four pixels $a_0$, $b_0$ and $a_1$, $b_1$ (their values represent intensity).

We can calculate the interstitial spatial and temporal intensity gradient between the four pixels as follows:

SpatialGradient=½[($a_0-b_0$)+($a_1-b_1$)]

TemporalGradient=½[($a_0-a_1$)+($b_0-b_1$)]

The units of spatial gradient are intensity level per pixel, and the units of temporal gradient are intensity level per sample time. If we multiply the spatial and temporal gradients together, we have a value whose units are intensity level squared per pixel sample time. We can then divide this by the square of the spatial gradient to yield a result with unit pixels per sample time, in other words, how many pixels the speckle has moved along the sensor within one sample time.

Where only one calculation is made, this is simply the same as dividing the temporal gradient by the spatial gradient. Over the entire array however, we can form the sum:

$$\sum_{i=1}^{n-1}(SG_i \times TG_i) / \sum_{i=1}^{n-1}(SG_i^2) \quad \text{Equation A}$$

over n pixels (where SG and TG are respectively the spatial and temporal gradients for each point in the array). This produces our oversampled displacement in terms of the number of pixels over which the speckle has moved during a sample time (the time to acquire the data).

Unlike correlation, this algorithm produces a result directly, with no expensive search. Also unlike correlation however, limitations of the algorithm are that the speckle must move somewhat less than the size of the speckle features between each sample, otherwise tracking cannot be maintained. Complexity of the above implementation can be traded for resolution if further simplification is required.

Simplification 1

To render the multiplications from the calculation even less costly, the spatial gradient on the left of the equation A can be replaced by + or −1, reflecting the direction of the spatial gradient (positive or negative). The scaling factor on the right becomes the sum of the absolution values of the spatial gradients. This yields equation B.

$$\sum_{i=1}^{n-1} [SIGN(SG_i) \times TG_i] / \sum_{i=1}^{n-1} ABS(SG_i) \qquad \text{Equation B}$$

Simplification 2

At a further cost of resolution, the temporal gradient can be replaced + or −1 reflecting the direction of the temporal gradient. In this case, the scaling factor on the right becomes simply n−1, giving equation C.

$$\sum_{i=1}^{n-1} [SIGN(SG_i) \times SIGN(TG_i)] / (n-1) \qquad \text{Equation C}$$

The following sets out another approach to obtaining a simple algorithm for extracting relative movement of the surface, usable in the embodiments described with reference to the drawings. The imaging array consists of a cross hair with 11 pixels in the X direction and 11 pixels in the Y direction (orthogonal to X). This can be realised as a small staring array of p-i-n photodiodes. The use of a staring array means that a continuous, rather than a sampled, image is available, and capture rate is purely a function of algorithm execution time. For general purposes, a capture rate of about 1 MHz is likely to be suitable, but higher or lower rates may be selected according to the requirements of the particular application and the hardware implementing it.

Figure 9:
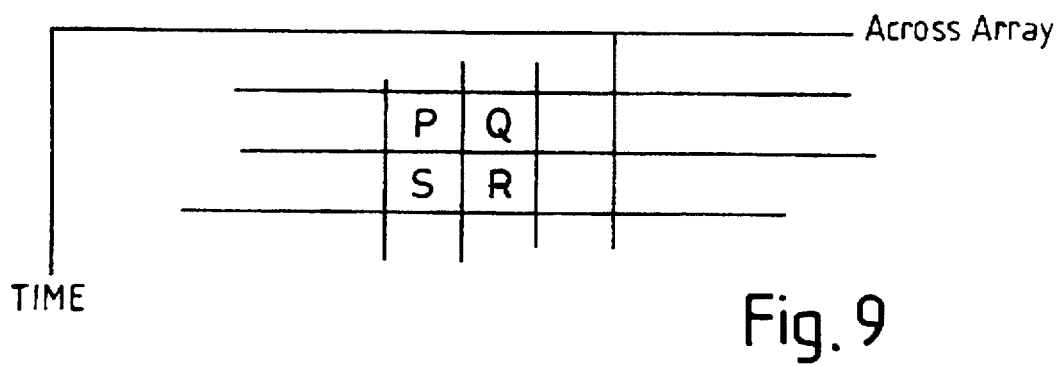
FIG. 9 is a diagram illustrating one stage in one algorithm for determining movement.

The simple nature of the algorithm means that it is possible that it could be fabricated on a VLSI chip as an analogue process. To explain the algorithm, consider four grey values P, Q, R and S. P and Q represent the speckle values seen by two adjacent sensors, while S and R are the values from the same sensors a short time later. FIG. 9 illustrates the relationship between the values. The gradient of the interstitial point (where P, Q, R and S meet in space and time) is calculated in space from $$((P-Q)+(S-R))/2 \qquad \qquad I$$

and in time from $$((P-S)+(Q-R))/2 \qquad \qquad II$$

The two gradients are then multiplied together (i.e. I×II). This is repeated over the entire array. Finally, a normalising value is calculated by summing all the spatial gradients I and a displacement value is calculated by summing all the products I×II over the array.

Displacement from one "capture" to the next is thus $$\Sigma(I \times II)/\Sigma(I^2)$$

The normalising value $\Sigma(I^2)$ compensates for the number of sensor elements and the varying speckle pattern which could otherwise modify the results. Tests suggest a resolution down to tens of nm (and better). The increased resolution opens up the possibility of a whole range of new applications, for example new forms of microphone.

Figure 10:
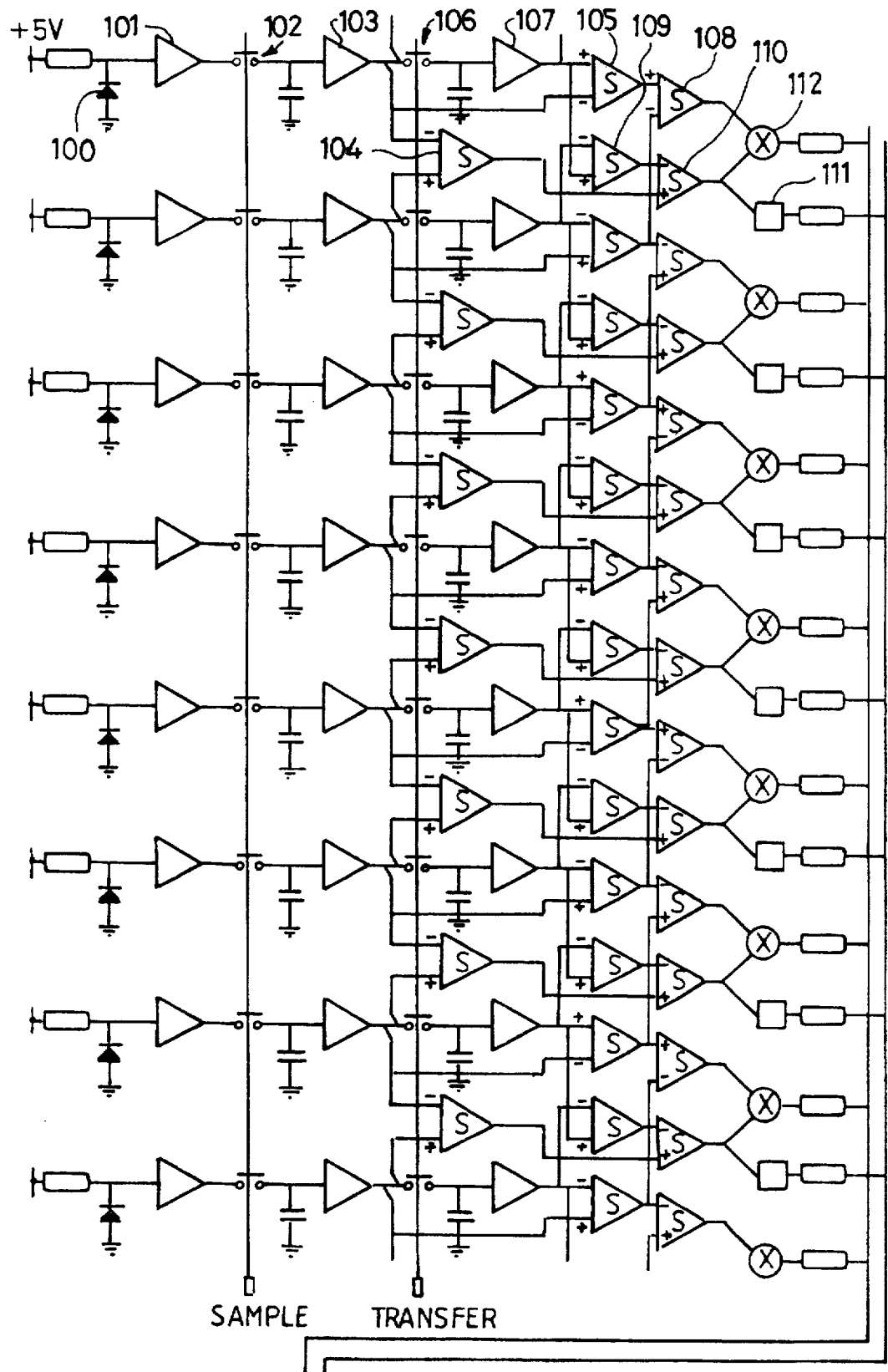
FIG. 10 is a block circuit diagram of a sampling and calculating means for a device in accordance with the invention.

FIG. 10 illustrates one possible circuit arrangement for performing the sampling and movement determination in a device according to the invention. It represents the circuit for one orthogonal direction of the array; the circuit for the other direction would be identical. Eight p-i-n photodiodes 100 are represented. The associated components for each pair of diodes are identical, and so only one stage will be described in detail. The signal from the diode 100 passes through a first buffer 101 and is switched to a second buffer 103 by an electronic sampling switch 102 in accordance with the desired sampling clock rate.

Considering the uppermost stage as handling the Q and R samples as represented in FIG. 9, the next stage down on the Figure handles the P and S samples. Thus, the sample from the second buffer 103 is the R (or more recent) sample, and this passes direct to a first subtractor 104, whose other input is the S sample from the next stage, giving an output from the subtractor of (S−R). The sample R also passes to a second subtractor 105 whose other input is the preceding sample Q, which has been passed on via an electronic transfer switch 106 and a third buffer 107 to provide the necessary delay. The output of the second subtractor is thus (Q−R), and this passes to a third subtractor 108 whose other input is the corresponding result from the next stage down, i.e. (S−P). The result is thus (Q−R)−(S−P)), which is equivalent to ((P−S)+(Q−R)).

The sample Q also passes to a fourth subtractor 109 whose other input is the sample P from next stage, the output from the subtractor 109 being (Q−P). This then passes to a fifth subtractor 110 whose other input is the output from the first subtractor 104. The result is ((S−R)−(Q−P)), which is equivalent to ((P−Q)+(S−R)), and this is passed to an ABS stage 111 which outputs the absolute (positive) value of the spatial gradient I. This stage is described in more detail hereinafter with reference to FIG. 11.

The output from the fifth subtractor also passes to a multiplier 112, described hereinafter in more detail with reference to FIG. 12 or FIG. 13. The other input to the multiplier 112 is the output from the third subtractor 108, i.e ((P−S)+(Q−R)), and its output is equivalent to equation II.

Referring to FIG. 11, the ABS stage 111 comprises a comparator 113 which tests the sign of the input and switches the output through a sign-reversing stage if the input is negative or allows it through direct if the input is positive in sign.

FIGS. 12 and 13 show alternative multipliers, 112. Ideally, a four quadrant analogue multiplier would be used, but the illustrated embodiments are easier to implement. In the version shown in FIG. 12, comparators 120 and 121 test the sign of I and II, and an exclusive OR-gate 122 giving effectively +1 or −1 output. This simplifies processing, but with a loss of possible resolution. FIG. 13 illustrates a mixed analogue and digital version, in which the temporal gradient is multiplied by the sign of the spatial gradient. This is achieved by a circuit which is essentially the same as that shown in FIG. 11, except that the switching of the direct or sign-reversing paths is made according to the sign of the spatial gradient applied to the comparator 130. The resolution achieved is intermediate to that achieved by a fully analogue approach and the fully digital approach of FIG. 12.

Returning to FIG. 10, the outputs from the ABS stages 111 and the multipliers 112 are accumulated at 114 and 115 respectively to give the scale and displacement outputs.

FIG. 14 illustrates the basis for a simpler approach to the calculation, in which the samples P, Q, R and S are separated spatially and temporarily as shown. This simplifies the necessary calculation to (S−R)×(P−Q). Circuits for carrying out this approach are illustrated in FIGS. 15 and 16. The sample stages may be as illustrated in FIG. 16 and as described hereinafter. For each subtraction, a pair of transistors is used. The transistors 150 and 151 in the first pair are set with their gain high such there is effectively a digital output depending on the sign of (S−R). The second pair of transistors 152 and 153 output values corresponding to P and Q, and the digital outputs from the first pair of transistors effectively switch, via devices 154 and 155, which of the P and Q values passes to the output, all the outputs being accumulated at 156 to provide a displacement value.

In the sampling circuit illustrated in FIG. 16, the output of the p-i-n photodiode 160 passes via a buffer 161 and a sampling switch controlled by the basic clocking rate of the device to a first transistor 162 whose output provides the P sample. A first shift switch 163 passes this to a second transistor 164 whose output provides the R and S samples for the two adjacent calculating sections as illustrated in FIG. 15. A second sampling switch 165 passes the signal to a third transistor 166 whose output provides the Q sample at the appropriate time.

It will be appreciated that, while bipolar transistors are shown in FIGS. 15 and 16, the use of MOS devices would be preferable for most applications.

The algorithms as described herein do not detect rotation of the surface relative to the detector, which could be important for a pen type application, especially in the recognition of handwriting. However, by employing a full 2D array of sensors, or a rosette of linear arrays, the rotation component may be calculated.

Figure 20:
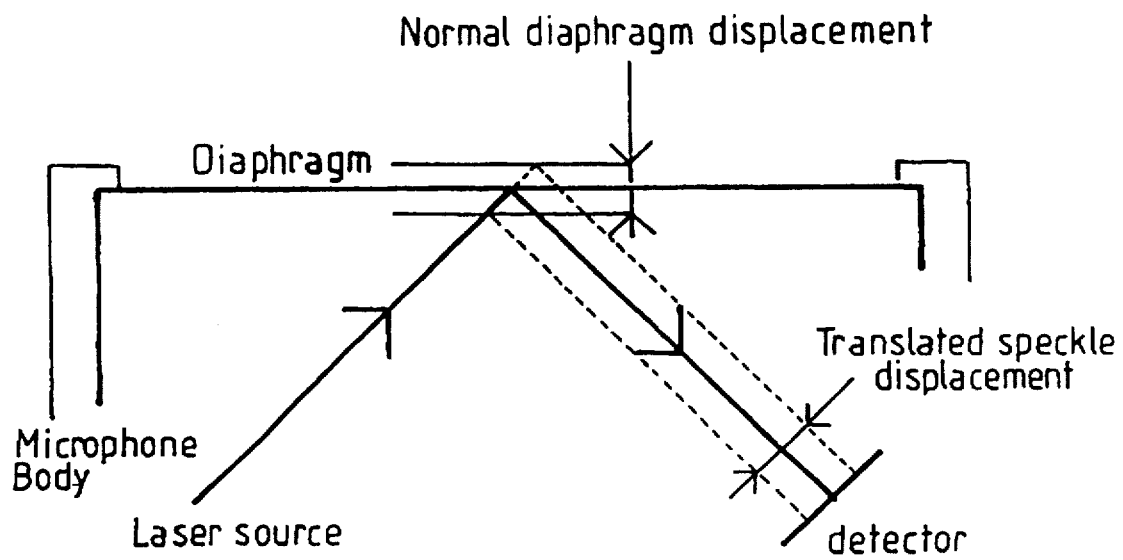
FIG. 20 is one possible arrangement of the laser source and the detector array in a digital microphone.

This technique can equally be applied to a digital microphone. A microphone is simply a device that measures the movement of a diaphragm to produce an output. In principle there is no reason why this measurement problem cannot be resolved using this laser speckle technique, to produce a digital microphone. The key problem associated with the microphone is that movement of the diaphragm results in a motion normal to the surface, whereas this technique as illustrated in FIG. 20 resolves motion along axes in the plane of the surface.

Careful arrangement of the laser source and sensor can translate the normal motion of the surface into one that may be measured by our technique. FIG. 4 illustrates one such physical arrangement. By angling the detector, speckle movement due to the diaphragm can be amplified to an arbitrary (user selectable) degree. The greater the movement amplification however, the less the incident light that falls on the detector, thus a balance must be reached.

Advantages of a digital microphone are numerous, and a direct conversion at the diaphragm itself provides the optimum results (no intermediate processing). This technique also allows the conversion to take place at a selected area on the diaphragm. This can be selected to minimise the distortion that normally occurs at the edges of the diaphragm.

We claim:

1. A device for determining movement of a surface relative to a detector, the detector comprising a source of radiation directed at the surface and a plurality of radiation sensors arranged to detect an intensity pattern due to interference in the radiation reflected back from the surface, the device also comprising means for repeatedly or continuously monitoring the outputs from the sensors, and comparison means for calculating a combination of the product of the interstitial spatial and temporal intensity gradients between adjacent sensors and using said gradients to yield a result indicative of the movement of the surface relative to the detector.

2. A device according to claim 1, wherein the device monitors the outputs from the sensors continuously or for many repeats thereby enabling spatial and/or temporal oversampling respectively.

3. A device according to claim 1 or 2, wherein the radiation is coherent radiation.

4. A device according to claim 3, wherein the radiation source is a laser.

5. A device according to claim 1, comprising a two-dimensional array of the radiation sensors.

6. A device according to claim 5 wherein the array comprises two intersecting lines of sensors extending substantially perpendicularly to each other.

7. A device according to claim 6 wherein the array comprises at least two sensors in each orthogonal direction.

8. A device according to claim 7, wherein the array comprises eight sensors in each orthogonal direction.

9. A device according to claim 5 comprising means for calculating for each adjacent pair of sensors in the array and for each successive pair of samples the gradient of the interstitial point in space and time according to the respective formulae:

$$((P-Q)+(S-R))/2 \quad \quad \text{I}$$

$$((P-S)+(Q-R))/2 \quad \quad \text{II}$$

wherein P and Q are the intensities measured by the adjacent sensors, and S and R are the intensities measured by the same sensors in the temporally next sample, means for multiplying together the two gradients, and means employing the formula:

$$\Sigma(I \times II)/\Sigma(I)^2$$

for calculating displacement from one sample to the next.

10. A device according to claim 5, comprising means for calculating the displacement from one sample to the next by employing the formula:

$$\sum_{i=1}^{n-1} [SIGN(SG_i) \times TG_i] / \sum_{i=1}^{n-1} ABS(SG_i)$$

Where SG and TG are respectively the spatial and temporal gradients between adjacent pairs of sensors.

11. A device according to claim 5 comprising means for calculating the displacement from one sample to the next by employing the forumula:

$$\sum_{i=1}^{n-1} [SIGN(SG_i) \times SIGN(TG_i)]/(n-1)$$

12. A pointing device for a computer, comprising a device according to claim 1 and a body having an aperture or window therein movable across a surface and means for mounting within the body in fixed relation to the aperture or window the radiation source and detector of said device, and interface means for transmitting to a computer signals representing the movement determined thereby.

13. A pointing device for a computer, comprising a device according to any of claim 1 and a body having a ball or other rolling member rollably mounted therein and means for mounting within the body in substantially fixed relation to the surface of the ball the radiation source and detector of said device, and interface means for transmitting to a computer signals representing the movements determined thereby.

14. A digital microphone device comprising a device according to claim 1 and a diaphragm responsive to sound waves wherein the radiation impinges on the surface of the diaphragm in order that motion normal to the diaphragm can be detected by measuring the displacement of the speckle pattern.

15. A method of determining movement of a surface relative to a radiation detector, comprising directing radiation at the surface and detecting by the radiation detector an intensity pattern due to interference in the radiation reflected from the surface, the detector comprising a plurality of radiation sensors, repeatedly or continuously monitoring the outputs from the sensors, and calculating a combination of the product of the interstitial spatial and temporal intensity gradients between adjacent sensors and using said gradients to yield a result indicative of the movement of the surface relative to the detector.

16. A method according to claim 15, wherein the radiation is coherent.

17. A method according to claim 15, wherein the radiation is electromagnetic radiation and is preferably infra red or visible light.

18. A method according to claim 15 comprising using a two-dimensional array of sensors to detect the intensity pattern.

19. A method according to claim 18, wherein the array comprises two intersecting lines of sensors extending substantially perpendicularly to each other.

20. A method according to claim 19, wherein the array comprises at least two sensors in each orthogonal direction.

21. A method according to claim 20, wherein the array comprises eight sensors in each orthogonal direction.

22. A method according to claim 19, comprising calculating for each adjacent pair of sensors in the array and for each successive pair of samples the gradient of the interstitial point in space and time according to the respective formulae:

$$((P-Q)+(S-R))/2 \qquad \text{I}$$

$$((P-S)+(Q-R))/2 \qquad \text{II}$$

wherein P and Q are the intensities measured by the adjacent sensors, and S and R are the intensities measured by the same sensors in the next sample, multiplying together the two gradients, and calculating displacement from one sample to the next from the formula:

$$\Sigma(I \times II)/\Sigma(I)^2.$$

23. A method according to claim 19 comprising calculating the displacement from one sample to the next by employing the formula:

$$\sum_{1}^{n-1} [\text{SIGN}(SG_i) \times TG_i] / \sum_{1}^{n-1} ABS(SG_i).$$

24. A method according to claim 19 comprising calculating the replacement from one sample to the next by employing the formula:

$$\sum_{i=1}^{n-1} [\text{SIGN}(SG_i) \times \text{SIGN}(TG_i)]/(n-1)$$

* * * * *